United States Patent
Wei et al.

(10) Patent No.: US 10,607,646 B2
(45) Date of Patent: *Mar. 31, 2020

(54) CALCULATING A HEATER POWER THAT COMPENSATES FOR LASER INDUCED WRITER PROTRUSION FOR A HEAT-ASSISTED MAGNETIC RECORDING DEVICE

(71) Applicant: Seagate Technology LLC, Cupertino, CA (US)

(72) Inventors: Zhen Wei, Maple Grove, MN (US); Hua Liu, Excelsior, MN (US)

(73) Assignee: Seagate Technology LLC, Cupertino, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/423,594

(22) Filed: May 28, 2019

(65) Prior Publication Data

US 2020/0058323 A1      Feb. 20, 2020

Related U.S. Application Data

(63) Continuation of application No. 16/104,214, filed on Aug. 17, 2018, now Pat. No. 10,319,400.

(51) Int. Cl.
| | | |
|---|---|---|
| *G11B 5/54* | (2006.01) | |
| *G11B 5/60* | (2006.01) | |
| *G11B 20/18* | (2006.01) | |
| *G11B 5/00* | (2006.01) | |

(52) U.S. Cl.
CPC .......... *G11B 5/607* (2013.01); *G11B 20/1816* (2013.01); *G11B 2005/0021* (2013.01)

(58) Field of Classification Search
CPC .......... G11B 5/607; G11B 20/1816; G11B 2005/0021; G11B 27/36; G11B 20/10; G11B 5/09; G11B 5/00; G11B 5/52; G11B 5/54
USPC ............. 360/31, 39, 55, 59, 75, 70
See application file for complete search history.

(56) References Cited

U.S. PATENT DOCUMENTS

| | | | |
|---|---|---|---|
| 8,199,422 B2* | 6/2012 | Annampedu | G11B 20/10305 360/39 |
| 8,792,203 B2 | 7/2014 | Chan | |
| 9,472,225 B2 | 10/2016 | Lou et al. | |
| 9,595,277 B2 | 3/2017 | Lou et al. | |
| 9,685,182 B1 | 6/2017 | Granz | |
| 9,704,529 B1 | 7/2017 | Lou et al. | |

(Continued)

*Primary Examiner* — Nabil Z Hindi
(74) *Attorney, Agent, or Firm* — Mueting, Raasch & Gebhardt, P.A.

(57) ABSTRACT

A method includes moving a heat-assisted magnetic recording (HAMR) slider relative to a magnetic recording medium. The slider comprises a writer, a writer heater, and a near-field transducer (NFT). For each of a plurality of different head-to media spacings a test tone is written to a track of the medium, the test tone is read and a Discrete Fourier Transform (DFT) of an amplitude of the read test tone is captured. A first DFT curve is generated at a beginning of writing the test tones. A second DFT curve is generated at a saturated state of writing the test tones. An amount of horizontal shift between the first and second DFT curves is computed. The amount of horizontal shift corresponding to writer heater power required to compensate for NFT clearance offset due to laser induced writer protrusion.

20 Claims, 7 Drawing Sheets

(56) References Cited

U.S. PATENT DOCUMENTS

| | | |
|---|---|---|
| 9,747,937 B1 | 8/2017 | Duda et al. |
| 2013/0286805 A1 | 10/2013 | Macken et al. |
| 2016/0232930 A1 | 8/2016 | Lou et al. |

* cited by examiner

US 10,607,646 B2

CALCULATING A HEATER POWER THAT COMPENSATES FOR LASER INDUCED WRITER PROTRUSION FOR A HEAT-ASSISTED MAGNETIC RECORDING DEVICE

RELATED PATENT DOCUMENTS

This application is a continuation of U.S. patent application Ser. No. 16/104,214, filed Aug. 17, 2018, which is incorporated herein by reference in its entirety.

SUMMARY

Embodiments described herein are directed to a method comprising moving a heat-assisted magnetic recording (HAMR) slider relative to a magnetic recording medium. The slider comprises a writer, a writer heater, and a near-field transducer (NFT). For each of a plurality of different head-to media spacings a test tone is written to a track of the medium, the test tone is read and a Discrete Fourier Transform (DFT) of an amplitude of the read test tone is captured. A first DFT curve is generated at a beginning of writing the test tones. A second DFT curve is generated at a saturated state of writing the test tones. An amount of horizontal shift between the first and second DFT curves is computed. The amount of horizontal shift corresponding to writer heater power required to compensate for NFT clearance offset due to laser induced writer protrusion.

Embodiments are directed to an apparatus comprising a slider movable relative to a magnetic recording medium, the slider comprising a writer, a heater, a near-field transducer, and an optical waveguide for communicating light from a laser diode to the near-field transducer. A controller is coupled to the slider and is configured to, for each of a plurality of different head-to-medium spacings, write a test tone to a track of the medium, read the test tone, and capture a Discrete Fourier Transform (DFT) of an amplitude of the read test tone. A first DFT curve is generated at a beginning of writing the test tones. A second DFT curve is generated at a saturated state of writing the test tones. An amount of horizontal shift between the first and second DFT curves is computed. The amount of horizontal shift corresponding to writer heater power required to compensate for NFT clearance offset due to laser induced writer protrusion.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part of the description hereof and in which are shown by way of illustration several specific embodiments. It is to be understood that other embodiments are contemplated and may be made without departing from the scope of the present disclosure. The following detailed description, therefore, is not to be taken in a limiting sense.

The present disclosure generally relates to detection and control of head-media spacing in data storage devices. The detection of head-to-media spacing becomes more challenging in what are referred to as heat-assisted magnetic recording or HAMR devices. This technology, also referred to as energy-assisted magnetic recording (EAMR), thermally-assisted magnetic recording (TAMR), and thermally-assisted recording (TAR), uses an energy source such as a laser to heat a small spot on a magnetic disk during recording. The heat lowers magnetic coercivity at the spot, allowing a write transducer to change magnetic orientation. Due to the relatively high coercivity of the medium after cooling, the data is less susceptible to superparamagnetic effects that can lead to data errors.

Generally, HAMR recording heads may utilize heaters for fine control of head-to media spacing. The heaters heat a portion of the recording head that faces the recording medium. The heating causes a local protrusion due to thermal expansion of the material. Thermal protrusion can be finely controlled to maintain a desired clearance between read/write transducers and the recording medium. In HAMR, a number of other components near the read and write transducers may contribute to thermal protrusion. This can make the estimation and control of head-to-media spacing more difficult in a HAMR recording head.

Figure 1:
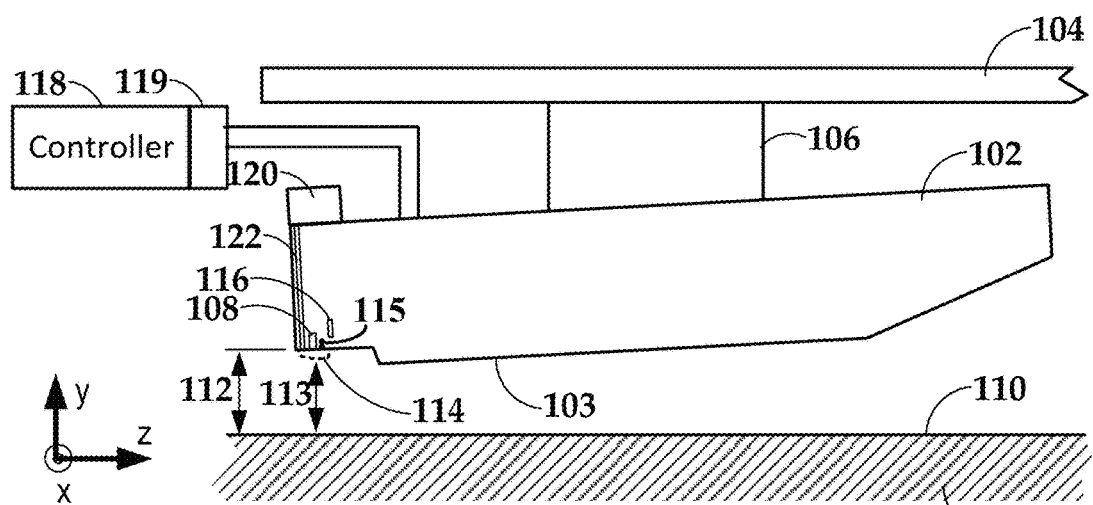
FIG. 1 is a block diagram of a heat-assisted magnetic recording (HAMR) head and media arrangement according to embodiments described herein.

In reference now to FIG. 1, a block diagram shows a side view of a slider 102 according to a representative embodiment. The slider 102 may also be referred to as a recording head, read head, read/write head, head, etc. The slider 102 is coupled to an arm 104 by way of a suspension 106 that allows some relative motion between the slider 102 and arm 104. The slider 102 includes read/write transducers 108 at a trailing edge that are held proximate to a surface 110 of a magnetic recording medium 111, e.g., magnetic disk. When the slider 102 is located over surface 110 of recording medium 111, a flying height 112 is maintained between the slider 102 and the surface 110 by a downward force of arm 104. This downward force is counterbalanced by an air cushion that exists between the surface 110 and an air bearing surface (ABS) 103 (also referred to as a "media-facing surface") of the slider 102 when the recording medium 111 is rotating.

It is desirable to maintain a predetermined slider flying height 112 over a range of drive operating conditions (e.g., different rotational speeds, temperatures, humidities, etc.) during both reading and writing operations to ensure consistent performance. Region 114 is a "close point" of the slider 102, which is generally understood to be the closest point of contact between the read/write transducers 108 and the magnetic recording medium 111, and generally defines the head-to-media spacing 113. To account for both static and dynamic variations that may affect slider flying height 112, the slider 102 may be configured such that a region 114 of the slider 102 can be configurably adjusted during operation in order to finely adjust the head-to-media spacing 113. This is shown in FIG. 1 by dotted line that represents a change in geometry of the region 114. In this example, the geometry change may be induced, in whole or in part, by an increase or decrease in temperature of the region 114. A thermal sensor 115 is shown situated at or near the close point 114 (e.g., adjacent the read/write transducers 108, such as near the near-field transducer) or can be positioned at other locations of the ABS 103 where protrusion of the ABS 103 is to be measured.

To provide this type of control over dynamic/effective head-to-media spacing 113 via heat, the slider 102 may include (or otherwise be thermally coupled to) one or more heating elements 116. These heating elements 116 (e.g., resistance heaters) may be provided with selectable amounts of current by a controller 118. Generally, the controller 118 at least includes logic circuitry for controlling the functions of an apparatus that includes at least the slider 102 and recording medium 111, and may include other components not shown, such as spindle motor, arm actuator, power supplies, etc. The controller 118 may include or be coupled to interface circuitry 119 such as preamplifiers, buffers, filters, digital-to-analog converters, analog-to-digital converters, etc., that facilitate electrically coupling the logic of the controller 118 to the analog signals used by the slider 102 and other components not shown.

Other elements of the slider 102 may also produce heat besides or in addition to the heating element 116. For example, a write coil of the read/write transducers 108 may generate sufficient heat to cause configurable deformation of region 114. This deformation will only occur when the coil is energized, e.g., when data is being written. Further, additional components within or near the HAMR head may generate heat near the read/write transducer 108. These heat-generating components include laser 120 (or other energy source), waveguide 122, and a near-field transducer (NFT) (not shown). The waveguide 122 delivers light from the laser 120 to components (e.g., NFT) near the read/write transducers 108. These components are shown in greater detail in FIG. 2.

Figure 2:
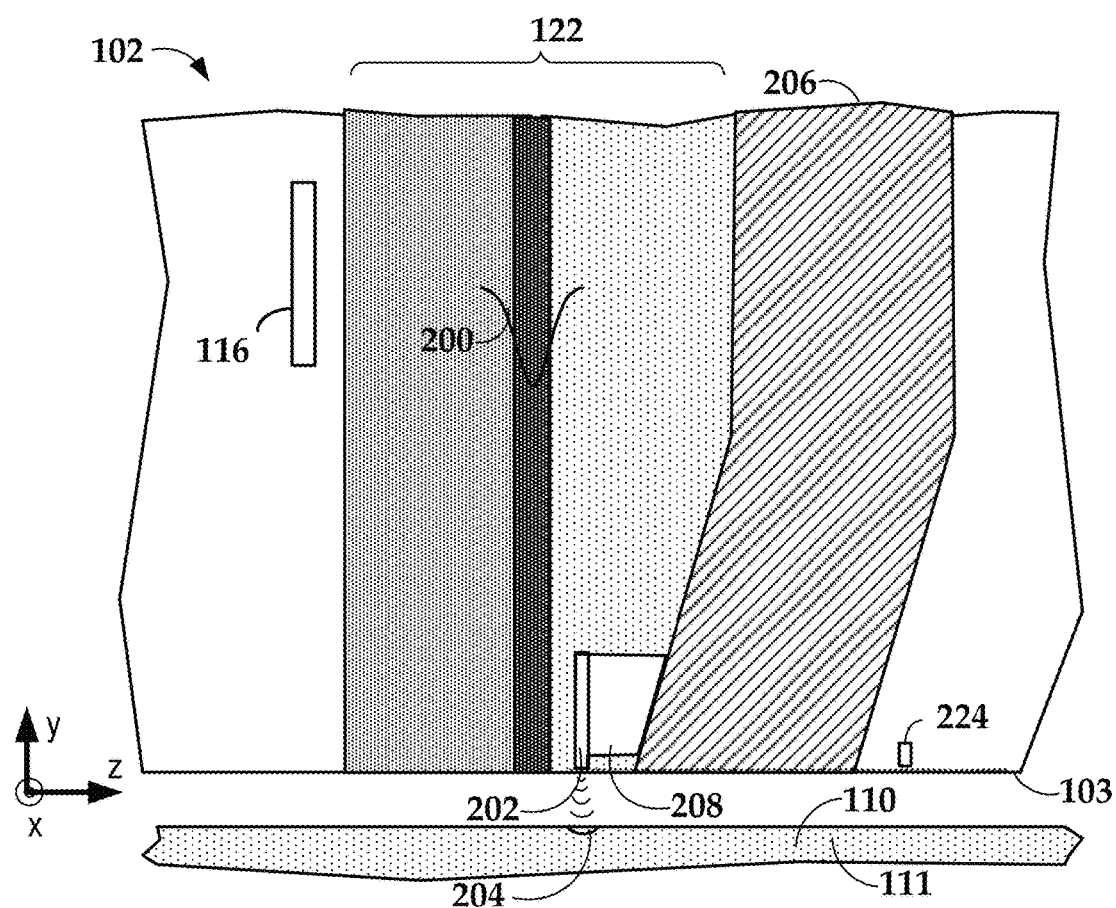
FIG. 2 is a cross-sectional view of a HAMR head according to embodiments described herein.

In FIG. 2, a block diagram illustrates a cross-sectional view of the slider 102 according to a representative embodiment. The waveguide 122 receives electromagnetic energy 200 from the energy source, the energy being coupled to the NFT 202. The NFT 202 is made of a metal (e.g., gold, silver, copper, etc.) that achieves surface plasmonic resonance in response to the applied energy 200. The NFT 202 shapes and transmits the energy to create a small hotspot 204 on the surface 110 of medium 111. A magnetic write pole 206 causes changes in magnetic flux near the media-facing surface 103 in response to an applied current. Flux from the write pole 206 changes a magnetic orientation of the hotspot 204 as it moves past the write pole 206 in the downtrack direction (z-direction).

The slider 102 additionally includes the heating element (heater) 116 that may be used to adjust the protrusion of the write pole 206/NFT 202, a read transducer (not shown) and a sensor 224. A writer heater may be situated proximate a writer of the slider 102, and a reader heater may be situated proximate a reader of the slider 102. The sensor 224 may be used for various purposes, such as head-to-medium spacing measurements and contact detection. The sensor 224 may be a temperature coefficient of resistance (TCR) type sensor, for example, a dual-ended TCR (DETCR). The slider 102 further includes a heat sink 208 that is thermally coupled to the NFT 202. The heat sink 208 may be used to draw heat away, e.g., to the write pole 206 or other nearby heat-conductive components, as the heat at the hotspot 204 increases.

Figure 3:
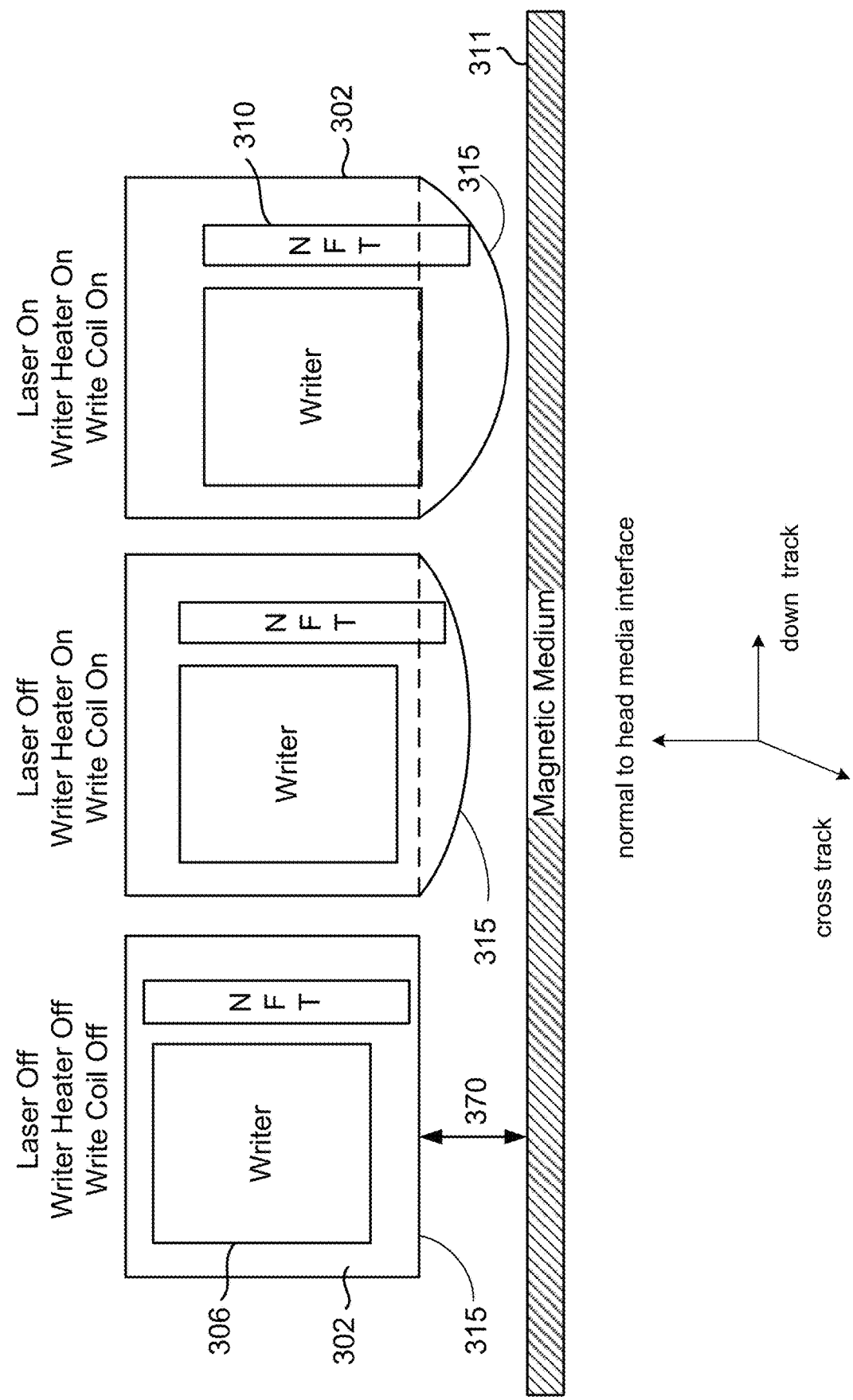
FIGS. 3A-3C are simplified side views of a writer portion of the slider illustrated in FIGS. 1 and 2 according to embodiments described herein.

FIGS. 3A-3C are simplified side views of a writer portion of the slider 302 illustrated in FIGS. 1 and 2. FIGS. 3A-3C show general protrusion progression of a portion of the slider ABS 315 in response to activation of different heat sources within the slider 302. These different heat sources include the write coil of the writer 306, the writer heater 307 (not shown for simplicity), and the laser 320 (not shown for simplicity) which produces the optical energy converted to heat by the NFT 310.

In FIG. 3A, the slider 302 is shown in a non-thermally actuated state. In this state, the laser 320, writer heater 307, and writer coil 306 are all off. Thus, the slider 302 attains a default, non-actuated shape/state establishing a default distance between the ABS 315 of the slider 302 and the surface of the magnetic storage medium 311. This default distance is illustrated by an air gap 370.

FIG. 3B illustrates the slider 302 in a partial-thermally actuated state, which is not a typical operational state but is shown for illustrative purposes. In this state, the writer heater 307 and the writer coil 306 are on, but the laser 320 is off. In response to activation of the writer heat sources (write pole, return pole) and writer heater 307, the ABS 315 at and surrounding the writer portion of the slider 302 protrudes into the air gap 370. Thus, the air gap 370 and the distance between ABS 315 and the medium surface 311 decreases. The dashed line in FIG. 3B indicates the default state/shape of ABS 315 depicted in FIG. 3A.

The magnitude of ABS protrusion of the slider 302 is further increased by the additional activation of the laser 320, as shown in FIG. 3C. The additional heat produced by the NFT 310 in response to the incident laser light further expands the ABS 315, causing the ABS 315 to protrude further into air gap 370. It can be seen in FIGS. 3A-3C that the stroke, or magnitude, of the air bearing surface protrusion along the cross track direction (z-axis) of the slider 302 changes in size and shape with introduction and removal of heat to/from the ABS 315.

Figure 4:
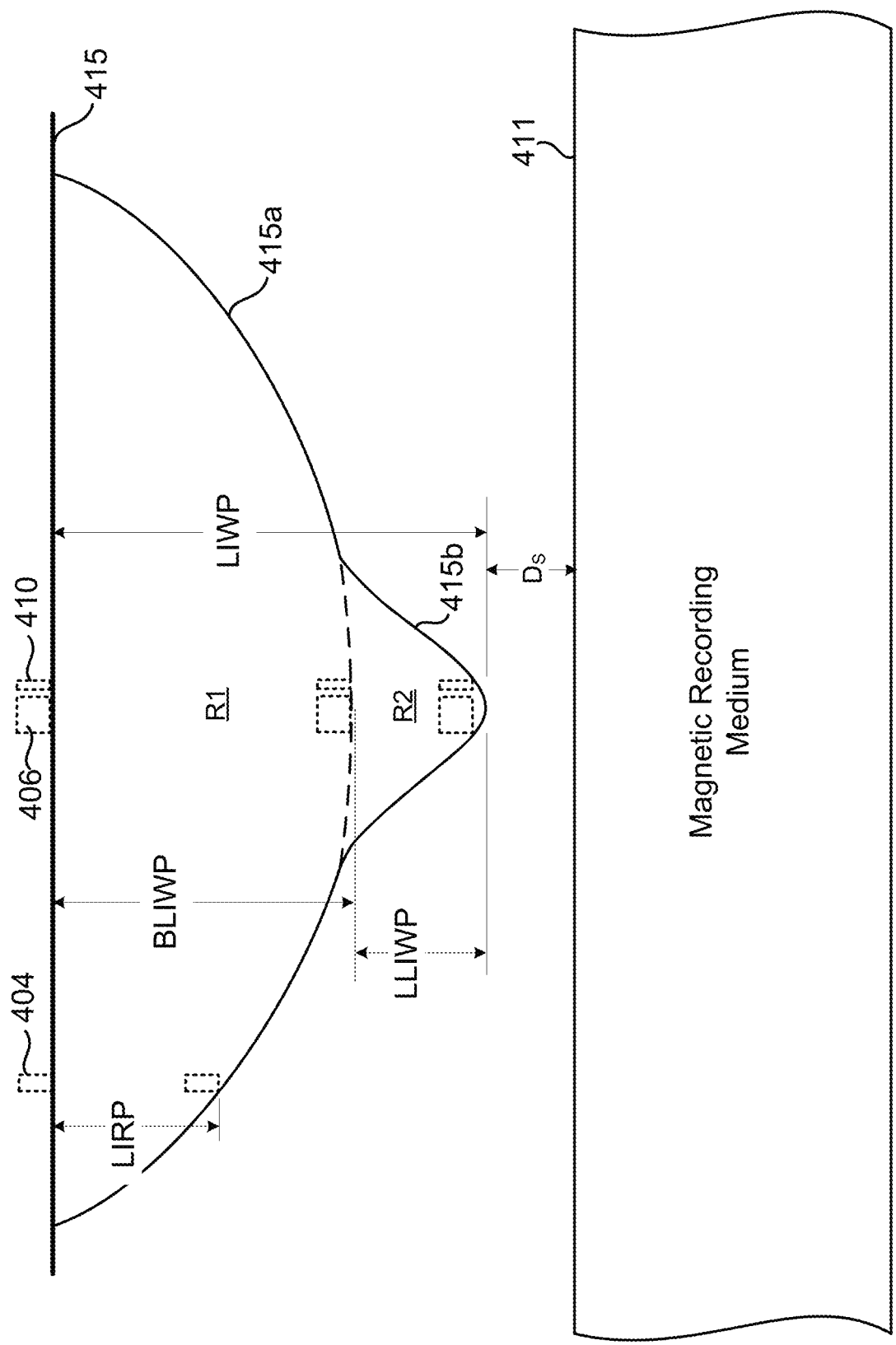
FIG. 4 is an exaggerated illustration of a laser-induced protrusion developed at an air bearing surface (ABS) of a HAMR slider according to embodiments described herein.

FIG. 4 is an exaggerated illustration of a laser-induced protrusion developed at the ABS 415 of a HAMR slider 400 in accordance with various embodiments. More particularly, the protrusion of the slider ABS 415 shown in FIG. 4 is referred to herein as Laser-induced Writer Protrusion (LIWP). As a shown in FIG. 4, the region of LIWP encompasses a writer 406 and an NFT 410 of the slider. LIWP represents the full excursion of the protrusion developed at the ABS 415 due to heating of the NFT 410 by excitation of the laser and other heat sources (e.g., the writer 206 and writer heater 207). The reader 404 is also subject to displacement by the ABS protrusion resulting from excitation of the laser of the slider. Protrusion of the slider ABS 415 due to laser/NFT heating in the region that encompasses the reader 404 is referred to herein as Laser-induced Reader Protrusion (LIRP). Because the reader 404 is situated away from the NFT 410/writer 406, allowing for dissipation of laser-induced heat, LIRP is not as pronounced as LIWP. However, LIRP is quite noticeable and impacts reader performance. It is noted that the features shown in FIG. 4 are not drawn to scale.

LIWP is understood to include two protrusion components. The first component of LIWP is a broad protrusion component, referred to herein as Broad Laser-induced Writer Protrusion (BLIWP). As the term implies, a relatively broad region of the ABS 415 surrounding the writer 406 and NFT 410 expands to form a protruded region (volume) R1 in response to the heat generated by the NFT 410 and the writer 406 (and writer heater 407). The second component of LIWP is a local protrusion component, referred to herein as Local Laser-induced Writer Protrusion (LLIWP). LLIWP is a small and narrow protrusion (relative to the BLIWP) that extends from the BLIWP in a direction towards the surface of the magnetic recording medium 411. As can be seen in FIG. 4, the BLIWP component encompasses a significantly larger volume (in region R1) of ABS material relative to that (in region R2) of the LLIWP component. Evaluation of experimental sliders has revealed that LIWP typically ranges between about 2 and 4 nm, while LLIWP typically ranges between about 1 to 2 nm (<2 nm). It is understood that, although each of LIWP, BLIWP, LLIWP, and LIRP involves expansion of a volume of ABS material, these protrusion parameters are measured in terms of a distance (in nanometers) extending from the ABS 415 and along a plane normal to the ABS 415 in a direction towards the recording medium 411.

As was discussed previously, excitation of the laser causes optical energy to impinge on the NFT 410, causing significant heating at the ABS 415 in the region of the NFT 410. The heat produced by the NFT 410 and the writer 406 (and other thermal sources, such as the writer heater, reader, and reader heater) causes thermal expansion of the surrounding ABS material, resulting in the BLIWP. Heating of the NFT 410 also results in high power density in the local region immediately surrounding the NFT 410, resulting in development of the LLIWP. Although the ABS material in region R1 subject to BLIWP and that of region R2 subject to LLIWP is essentially the same, the thermal time constant of the material in region R1 and region R2 vary significantly from one another. For example, the thermal time constant of the material in region R1 (subject to BLIWP) is between about 100 and 200 µs, which is similar to that of ABS material subject to heating by the writer heater or the reader heater. The thermal time constant of the material in region R2 (subject to LLIWP) is around 1 µs or less.

Figure 5:
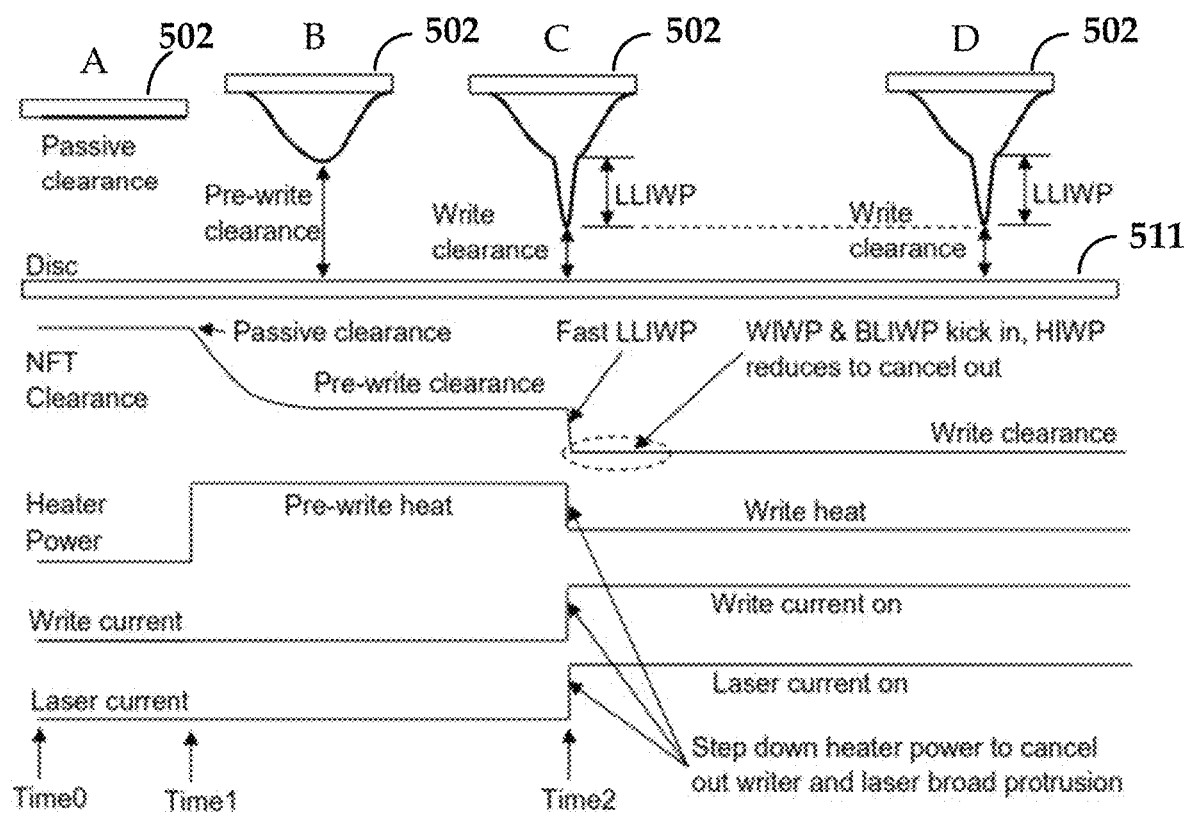
FIG. 5 is a block diagram illustrating passive, pre-write, and write clearance between a magnetic recording medium and a HAMR head according to embodiments described herein.

If the target pre-write and write clearances have been established, a HAMR slider will operate under the clearance progression illustrated in FIG. 5. As shown, the clearance between slider 502 and medium 511 transitions from the slider 502 at a passive clearance stage A (before pre-write heat is applied), to a target pre-write clearance stage B (pre-write heat has been applied), to a target write clearance stage C (when heater, writer and laser heat is applied), and the target write clearance stage D (steady-state write is occurring). As the slider 502 transitions through the clearance progression, it operates in accordance with the timing diagram of FIG. 5.

At time 0, the heater is off and the slider 502 is flying at the passive clearance. At time 1, at three times the heater constant to five times the heater time constant ahead of writing, the heater is turned on to a pre-write heat power level. At this point, the slider will protrude down to the target pre-write clearance adequately before the write starts. At time 2, the write operation starts with the write current and the laser is turned on. The laser induced LLIWP will cause the NFT to protrude from the target pre-write clearance down to the target write clearance at a fast time constant. According to various embodiments, fast time constant is 1 to 2 µsec. In some cases, the short time constant is below about 500 ns. At time 2, the write current and the laser will also start the slider to protrude with WIWP and BLIWP at a long time constant, e.g., ~150 µsec. The heater power then steps from pre-write heat down to write heat to compensate for WIWP and BLIWP to maintain the target write clearance throughout the write process.

According to various configurations, it may be difficult to capture LLIWP because it has too small an area to generate mechanical signal for thermal sensor detection. An electrical based NFT clearance detection metrology may be used to deliver laser induced NFT protrusion measurement. According to various embodiments, the clearance detection metrologies described herein may be used to measure protrusions with fast time constants and/or protrusions with slow time constants.

Figure 6:
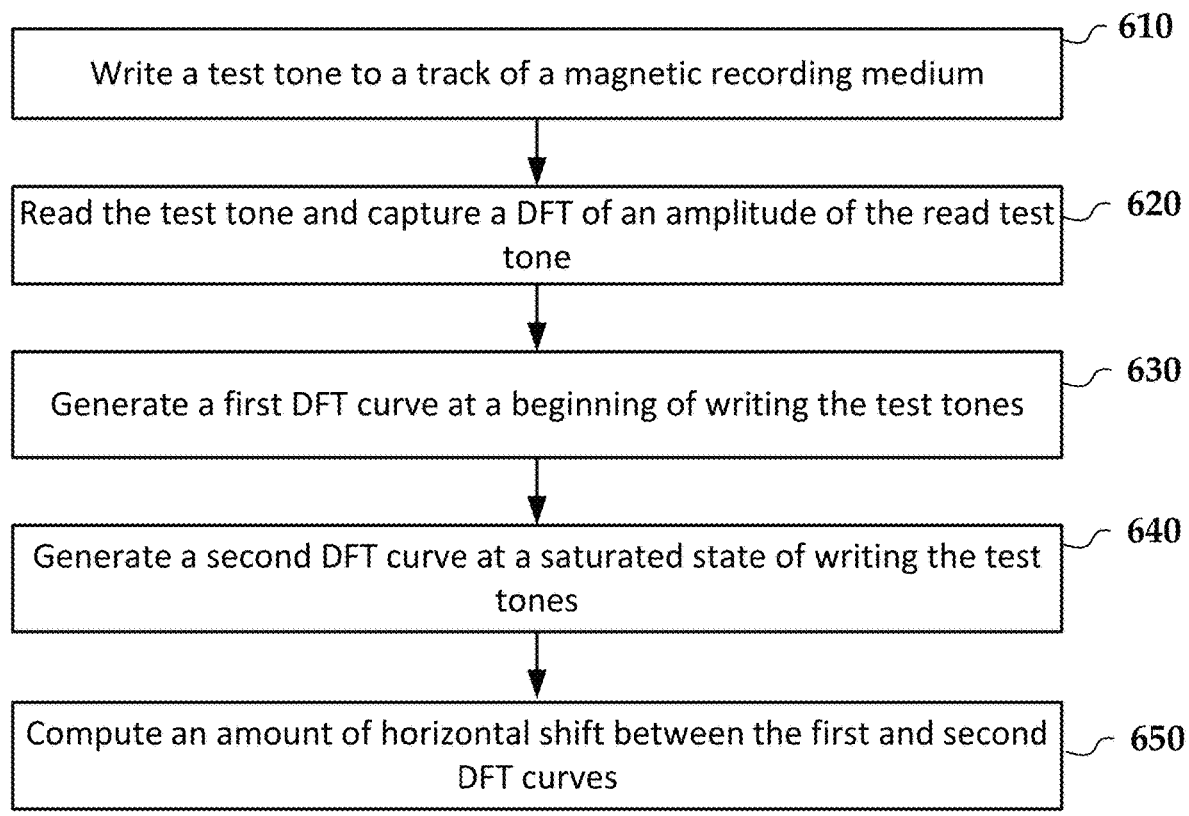
FIG. 6 illustrates a process to use a first DFT curve and an average DFT curve to calculate at least the fast LIWP in accordance with embodiments described herein.

According to various embodiments described herein, three dimensional amplitude to head-to-media spacing transfer curves can be used to calculate the corresponding fast or slow LIWP depending on the reading time window used. FIG. 6 illustrates a process to use these curves to calculate at least the fast LIWP in accordance with embodiments described herein. A test tone is written 610 to a track of a magnetic recording medium. The test tone is read 620 and a Discrete Fourier Transform (DFT) of an amplitude of the read test tone is captured. According to various embodiments, the test tones are written and read for a plurality of head-to-media spacings. According to various embodiments, the test tones are written and read for a plurality of head-to-media spacings. In some cases, the test tones are written and read for a plurality of head-head to media spacings in a range of about 0 nm to about 6 nm. The head-to-media spacings may be adjusted by using different heater powers, for example. A first DFT curve is generated 630 at a beginning of writing the test tones. A second DFT curve is generated 640 at a saturated (steady-state) of writing the test tones. According to various embodiments, the saturated state occurs at or before writing the last sector of data to the magnetic recording medium. An amount of horizontal shift between the first and second DFT curves is computed 650. According to various embodiments, the first and average DFT curves are captured over one revolution of the magnetic recording medium.

According to various embodiments described herein, the test tones are written and read at a plurality of head to media spacing levels. At each head-to-media spacing level, the pre-heat may be set to be the same as the write head, which means that writer coil protrusion and laser protrusion are not compensated at the start of writing. The head-to-media spacing sweep may begin at a distance further from the media and progressively get closer to the media. Before writing the test tones at each head-to media spacing level, the track may be erased.

Figure 7:
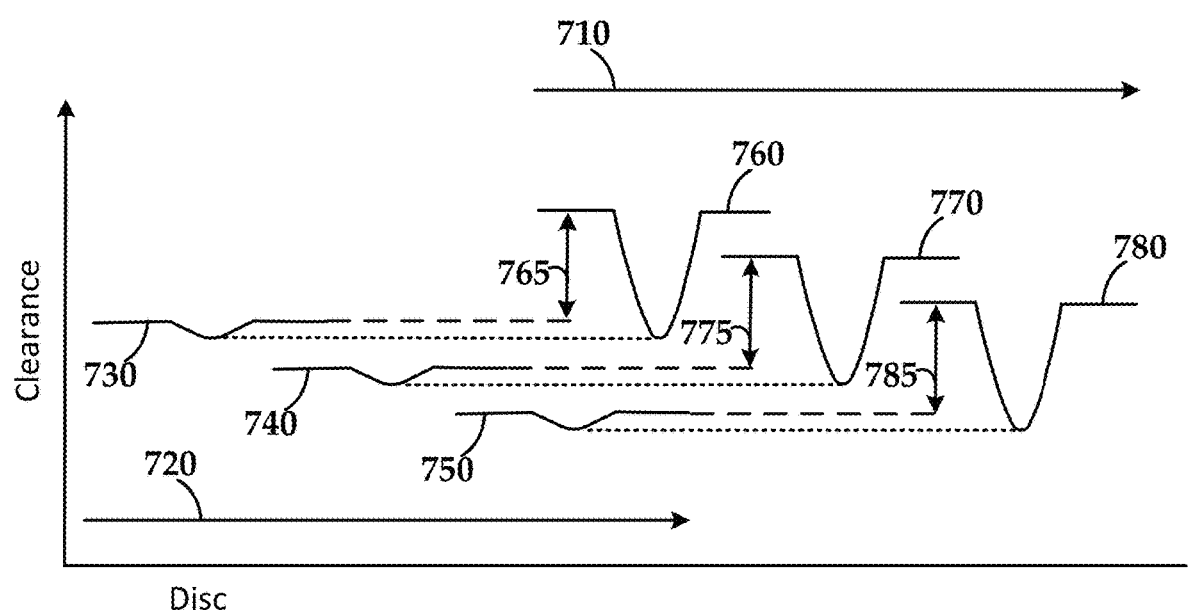
FIG. 7 shows the head-to-media spacing for a first DFT curve and the head to media spacing for the average DFT curve according to embodiments described herein.
Figure 8:
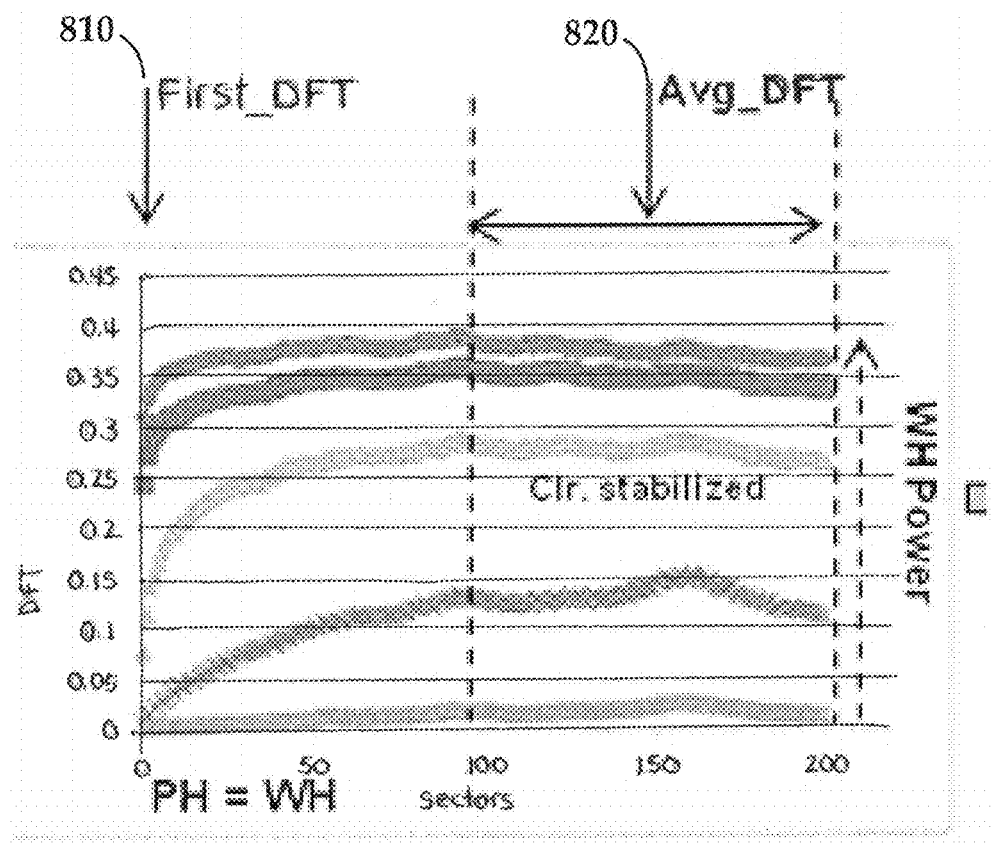
FIG. 8 illustrates the DFT curves for a variety of head to media spacings versus the number of sectors read according to embodiments described herein.

FIG. 7 shows the head-to-media spacing for a first DFT curve 730, 740, 750 and the head to media spacing for the average DFT curve 760, 770, 780. In this example, there are three different head-to media spacings for both the first 730, 740, 750 and the average DFT curve 760, 770, 780. It is to be understood that more or fewer head-to-media spacings may be used. According to various configurations, the first DFT curve represents cases with a substantially zero or a near zero LIWP. To achieve the near-zero LIWP, the first DFT curves are taken at the beginning of writing the test tones. The heater power is increased along line 720 to reduce the head-to media spacing and thus increasing the DFT values. The average DFT curve represents cases with substantially full LIWP. The heater power is increased along line 710 to reduce the head-to media spacing. At locations where the DFT has the same value in both first and average DFT curves, the NFT clearance is equal in both cases, but the amount of heater power used is different. The amount of heater power difference represents the extra heater power that can be used to compensate NFT clearance offset due to LIWP 765, 775, 785 at various head-to media spacing levels FIG. 8 illustrates the DFT curves for a variety of head to media spacings versus the number of sectors read. The first DFT 810 is taken at substantially zero sectors read. The average DFT 820 is taken when the writing is saturated. At this point, the DFT is substantially stable. In some cases, the average DFT is determined when substantially all sectors have been read. According to various configurations, the average DFT may be determined when greater than 50% of the sectors have been read.

Figure 9:
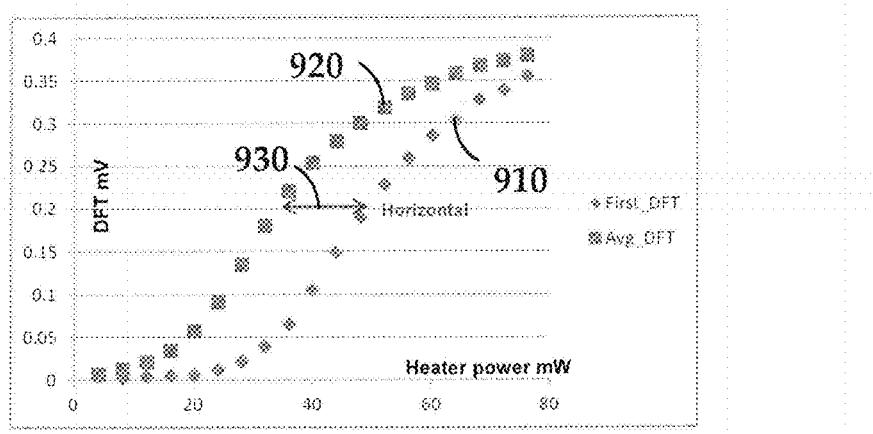
FIG. 9 shows the voltage amplitude versus the writer power for the first DFT and the average DFT according to various embodiments described herein.

FIG. 9 shows the voltage amplitude versus the writer power for the first DFT 910 and the average DFT 920 according to various embodiments described herein. The first DFT curve 910 is shifted to the average DFT curve 920. The power shift 930 from the first DFT curve 910 to the average DFT curve 920 represents the extra heater power that can be used to compensate NFT clearance offset due to LIWP at various head-to media spacing levels.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

The invention claimed is:

1. A method, comprising:
    moving a heat-assisted magnetic recording (HAMR) slider relative to a magnetic recording medium, the slider comprising a writer, a writer heater, and a near-field transducer (NFT);
    for each of a plurality of different head-to-medium spacings:
        writing a test tone to a track of the medium; and
        reading the test tone and capturing a Discrete Fourier Transform (DFT) of the read test tone;
    generating a first DFT curve at a beginning of writing the test tones;
    generating a second DFT curve after generating the first DFT curve; and
    computing an amount of shift between the first and second DFT curves, the amount of shift corresponding to writer heater power required to compensate for NFT clearance offset due to laser induced writer protrusion.

2. The method of claim 1, wherein reading the test tone and capturing a DFT of the read test tone further comprises capturing a DFT of an amplitude of the read test tone.

3. The method of claim 1, wherein computing an amount of shift between the first and second DFT curves comprises computing an amount of horizontal shift between the first and second DFT curves.

4. The method of claim 1 further comprising adjusting the writer heater power based on the computed amount of shift.

5. The method of claim 1 wherein the plurality of head-to-media spacings are in a range of about 0 nm to about 6 nm.

6. The method of claim 1, wherein computing an amount of shift comprises determining a difference in writer heater power used to achieve a same head-to media spacing for the first DFT curve and the average DFT curve.

7. The method of claim 1 further comprising erasing the track before writing the test tone to the track.

8. The method of claim 1, wherein generating a second DFT curve after generating the first DFT curve comprises generating a second DFT curve at a saturated state of writing the test tones generating a second DFT curve after generating the first DFT curve.

9. The method of claim 1, wherein the first and second DFT curves are captured over one revolution.

10. The method of claim 1, wherein for each head-to-medium spacing a preheat level is set to be substantially the same as a write-heat level.

11. The method of claim 1, wherein the horizontal shift includes local laser induced writer protrusion (LLIWP).

12. The method of claim 1, wherein:
    the laser induced writer protrusion comprises a first region having a first thermal time constant and a second region having a second thermal time constant;
    the second region is closer to the medium than the first region; and
    measuring comprises measuring the magnitude of at least the second region.

13. An apparatus comprising:
    a slider movable relative to a magnetic recording medium, the slider comprising a writer, a heater, a near-field transducer, and an optical waveguide for communicating light from a laser diode to the near-field transducer; and
    a controller coupled to the slider and configured to:
    for each of a plurality of different head-to-medium spacings:
        write a test tone to a track of the medium; and
        read the test tone and capturing a Discrete Fourier Transform (DFT) of the read test tone;
    generate a first DFT curve at a beginning of writing the test tones;
    generate a second DFT curve after generating the first DFT curve; and
    compute an amount of shift between the first and second DFT curves, the amount of shift corresponding to writer heater power required to compensate for NFT clearance offset due to laser induced writer protrusion.

14. The apparatus of claim 13, wherein the controller is configured to capture a DFT of an amplitude of the read test tone.

15. The apparatus of claim 13, wherein the controller is configured to compute an amount of horizontal shift between the first and second DFT curves.

16. The apparatus of claim 13 wherein the controller is further configured to adjust the writer heater power based on the computed amount of horizontal shift.

17. The method of claim 13 wherein the plurality of head-to-media spacings are in a range of about 0 nm to about 6 nm.

18. The method of claim 13, wherein the controller is configured to determine a difference in writer heater power used to achieve a same head-to media spacing for the first DFT curve and the average DFT curve.

19. The apparatus of claim 13, wherein the controller is further configured to erase the track before writing the test tone to the track.

20. The apparatus of claim 13, wherein generating a second DFT curve after generating the first DFT curve comprises generating a second DFT curve at a saturated state of writing the test tones.

* * * * *